United States Patent [19]

Nitzbon

[11] 4,273,210
[45] Jun. 16, 1981

[54] ROLLER UNIT FOR WINDING-UP SAFETY BELTS FOR MOTOR VEHICLES

[75] Inventor: Karl-Heinz Nitzbon, Hamburg, Fed. Rep. of Germany

[73] Assignee: Autoflug GmbH, Rellingen, Fed. Rep. of Germany

[21] Appl. No.: 96,886

[22] Filed: Nov. 23, 1979

Related U.S. Application Data

[63] Continuation of Ser. No. 920,285, Jun. 29, 1979, abandoned.

[30] Foreign Application Priority Data

Jun. 29, 1977 [DE] Fed. Rep. of Germany ....... 2729301

[51] Int. Cl.³ ...................... A62B 35/02; B65H 75/48
[52] U.S. Cl. ............................. 180/268; 242/107.4 A; 280/806
[58] Field of Search .................. 242/107.4 R–107.4 E; 280/806, 807; 180/268, 269, 270; 297/477, 478, 480

[56] References Cited

U.S. PATENT DOCUMENTS

| 3,240,510 | 3/1966 | Spouge | 242/107.4 A X |
| 4,007,802 | 2/1977 | de Rosa | 242/107.4 A X |
| 4,065,071 | 12/1977 | Holmberg | 242/107.4 A |

FOREIGN PATENT DOCUMENTS

| 2266524 | 10/1975 | France | 242/107.4 A |
| 2288650 | 5/1976 | France | 242/107.4 A |

Primary Examiner—John M. Jillions
Attorney, Agent, or Firm—Becker & Becker, Inc.

[57] ABSTRACT

A roller unit for winding up a safety belt for motor vehicles with a built-in device for blocking the pulling-out of the safety belt in response to certain movements or positions of the pertaining vehicle. The device includes a sensor with a magnetically attractable inertia body, e.g. a ball or a pendulum, which is operatively connected to a pawl. The pawl, when occupying a first position engages teeth operable to control a blocking disc, thereby initiating a blocking operation. Adjacent the inertia body there is provided an electromagnet for exerting a deflecting action upon the inertia body.

5 Claims, 2 Drawing Figures

ROLLER UNIT FOR WINDING-UP SAFETY BELTS FOR MOTOR VEHICLES

This is a continuation of copending application Ser. No. 920,285-Nitzbon filed June 29, 1979, now abandoned.

The present invention relates to a safety belt winding-up roller for motor vehicle safety belts with built-in device for blocking the pulling of the belt in case of certain movements or positions of the respective vehicle. More specifically, the present invention relates to a winding-up of the above mentioned type which comprises a sensor with magnetically attractable inertia body for instance ball or pendulum, which is operatively connected to a ratchet pawl which in one position engages teeth influencing a blocking member for instance a blocking disc to thereby initiate the blocking operation.

A heretofore known safety belt winding-up roller of the above mentioned type has become known by German Gebrauchsmuster No. 74 25 531 which roller comprises a blocking device with two sensor systems for dividing up the blocking action namely with one system responding to the pull-out acceleration of the safety belt, and with another system corresponding to the movements or position of the vehicle. The said movements of the vehicle as a rule concern acceleration or retardation.

The present invention is based on the finding that it may be advantageous when the blocking of the belt pull-out is initiated not only when the vehicle as a whole—and thus the belt winding-up roller are accelerated or retarded—but already when the driver initiates corresponding steps, in other words actuates the brake or steps on the accelerator in order preferably in connection with an automatic transmission, suddenly to suddenly accelerate. Already at this instant of initiating an acceleration, the passengers should no longer be able to pull out the belt but should be held back against the back of the seat. This is particularly important for passengers, especially passengers on the back seat.

It is, therefore, an object of the present invention to provide a safety belt winding-up roller of the above mentioned type with an additional sensitivity with regard to blocking, which sensitivity will be independent from the acceleration of the safety belt and vehicle movements or positions.

This object and other objects and advantages of the invention will appear more clearly from the following specification in connection with the accompanying drawing, in which.

Figures 1, 2:
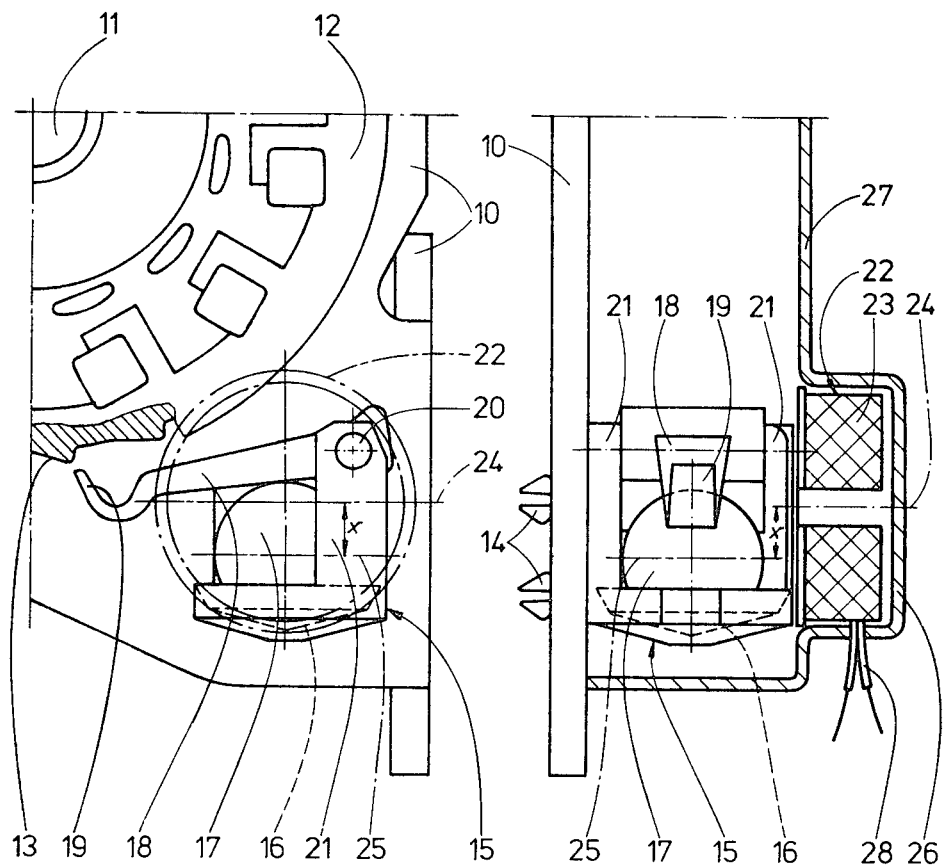
FIG. 1 is a side view of a cutout of an automatically blocking belt winding-up roller with ball sensor without cover cap.
FIG. 2 is a view turned by 90° relative to FIG. 1 of the ball sensor with electromagnet and cover cap.

The winding-up roller for safety belts of motor vehicles, according to the present invention is characterized primarily in that adjacent the inertia body there is arranged an electromagnet for a deflecting action upon the inertia body. In view of this arrangement, the safety of the passenger in the vehicle is advantageously increased inasmuch as for instance the safety belt of the passenger in case of a braking action can be blocked not only at the actual occurrence of the retardation or slowdown of the vehicle but already prior thereto when the driver for instance actuates the foot brake. This is particularly important also for accelerations and driving through curves.

For the sake of completeness, it may be mentioned that the employment of electromagnets with belt winding-up rollers for safety belts in motor vehicles has become known by German Offenlegungsschrifts 14 30 422, 24 21 533, and 25 06 696. With these known devices, the magnet forces do not act upon the inertia body of a sensor but act directly upon the pawl so that no additional sensitiveness is present. In contrast thereto, the suggestion according to the present invention concerns a provision of a further sensor, i.e., a third sensor in case of a safety belt winding-up roller with belt sensitive and vehicle sensitive system.

The electric control of an electromagnet by the lighting up of the brake lights of a vehicle in response to the actuation of the foot brake is known by the above mentioned German Offenlegungsschrift No. 24 21 533. A corresponding circuit of the electromagnet according to the invention is for this reason not a feature of the present invention.

Referring now to the drawing in detail, the belt winding-up roller comprises a customary substantially U-shaped housing 10 in which there is journalled a belt winding-up shaft 11 which among others carries an inertia disc 12 the circumference of which on the inner side thereof has cast thereon outer teeth 13. Shaft 11 and disc 12 are for the sake of simplicity shown only in FIG. 1.

Connected to the housing 10 by means of spreading pins 14 there is a ball sensor 15 which likewise in customary manner comprises a ball cup 16 for receiving a steel ball 17, and furthermore comprises a pawl with belt tip 19.

The pawl 18 is by means of two axle pins 20 journalled on two jaws 21 which form one piece with the ball cup 16.

The ball sensor 15 forms a vehicle sensitive system and therefore acts in such a way that in response to accelerations or retardations exerted upon the vehicle and thereby upon the winding-up roller of the safety belt, the ball 17 in the cup 16 is caused to move out whereby the pawl 18 is lifted and its tip is caused to engage the teeth 13. As a result thereof, a relative change in position of the inertia disc 12 occurs relative to shaft 11 and a ratchet member arranged thereon but not shown in the drawing, so that the shaft 11 will be blocked. The pawl 18 with tip 19 remains practically free from load. A corresponding operation is affected when the vehicle is parked for instance on a slope, whereby the ball 17, in view of the cup 16 likewise moves out.

Adjacent the ball sensor 15 there is provided an electromagnet 22 with coil 23, while the central axis 24 of coil 23 extends in spaced relationship to the central axis 25 of ball 17. The last mentioned central axis is parallel to said central axis 24. For receiving the electromagnet 22 there is provided a bulge 26 of a customary cover cap 27 for the so-called system side of the belt winding-up roller, said bulge 26 being adapted to the shape and size of said electromagnet. The electromagnet 22 can be directly fastened in said bulge 26, for instance by cementing. A current supply line 28 extends from the electromagnet 22 through the cap 27 to the electrical circuit of the vehicle which circuit controls the magnet. In this connection, the electrical circuit of the brake lights may be employed.

The electromagnet 22 is arranged near the ball sensor 15 which means at a distance therefrom and at a spot which will assure that the ball 17 can be attracted by the magnet. Such attraction occurs when the magnet is energized while the ball 17 is in its cup 16 deflected in the direction toward the magnetic coil 23. In view of the shape of said cup, the ball will in this connection move upwardly to a certain extend whereby the distance x is reduced. The provision of this spacing decreases the force which has to be employed in order to deflect the ball. Inherent thereto is the advantage that the magnet can be designed particularly small.

In operation, the electromagnet 22 is energized for instance by actuation of the foot brake of the motor vehicle so that the ball 17 will be attracted to the magnet. In this connection, the ball moves in said cup upwardly at an incline whereby also the pawl 18 resting on the ball is lifted and with its tip 19 engages the next tooth of the teeth 13. In this way, the safety belt winding-up shaft 11 is blocked without resorting to or depending on the safety belt sensitive or vehicle sensitive system. The blocking is rather effected in a third way namely by the additional sensor 22.

It is, of course, to be understood that the present invention is by no means limited to the specific showing in the drawing, but also comprises any modifications within the scope of the appended claims.

What I claim is:

1. A roller unit for winding up a safety belt for motor vehicles with a built-in device for blocking the pulling-out of the safety belt in response to certain movements and positions of a vehicle equipped with said unit, said device including in combination:
    a sensor comprising a magnetically attractible spherical inertia body provided as a steel ball having a center of gravity with axes passing therethrough as well as being responsive to accelerating and retarding movement of a vehicle equipped with said device, a ball cup as a support with a center for receiving the ball, said ball resting in said ball cup as the support having inclined surfacing sloping upwardly from the center of the ball cup to permit ball movement responsive to vehicle movement,
    rotatable means for winding up a safety belt,
    a blocking disc rotatably connected to said rotatable means,
    ratchet gear means connected to said blocking disc for rotation therewith,
    pawl means resting on said ball and operable to engage and disengage said ratchet gear means upon upward movement of the ball upon said inclined surfacing of said ball cup, said pawl means being operable by said ball upon upward movement on said inclined surfacing of said ball cup to move from an ineffective position in which it is disengaged from said ratchet gear means into an effective position in which it engages said ratchet gear means and thereby blocks rotation of said blocking disc and said rotatable means, and
    an electromagnet with a coil having an axis arranged closely in the vicinity of said ball in said ball cup with minimum spacing therebetween, said coil being operable when energized to exert an attractive force directly upon said ball to cause the ball to move upwardly on said inclined surfacing of said ball cup to positively move said pawl means upwardly into engagement with said ratchet gear means thereby causing blockage of said rotatable means for the safety belt, the axis of the coil of said electromagnet being spaced upwardly from one of the axes of said ball which passes through the center of gravity of said ball and parallel to said axis of the coil so that electromagnet forces are effective in a direction corresponding to ball movement on said inclined surfacing of said ball cup and substantially parallel to said coil axis by a distance necessary to cause said ball to move said pawl means into its effective position.

2. A roller unit in combination according to claim 1 which includes a cover having an inside surface, said electromagnet with said coils being connected to said inside surface.

3. A roller unit in combination according to claim 2 in which said cover is provided with a bulged-out section corresponding exactly in size to the inside surface to which electromagnet is connected.

4. A roller unit in combination according to claim 3 in which said electromagnet is energized electrically responsive to actuated braking of a vehicle equipped with said device.

5. A roller unit for winding up a safety belt for motor vehicles with a built-in device for blocking the pulling-out of the safety belt in response to certain movements and positions of a vehicle equipped with said unit, said device including in combination:
    a sensor comprising a magnetically attractible ball resting in a saucer,
    rotatable means for winding up a safety belt,
    a blocking disc rotatably connected to said rotatable means, ratchet gear means connected to said blocking disc for rotation therewith,
    pawl means resting on said ball and operable to engage and disengage said ratchet gear means upon upward movement, said pawl means being operable by said ball upon upward movement in said saucer to move from an ineffective position in which it is disengaged from said ratchet gear means into an effective position in which it engages said ratchet gear means and thereby blocks rotation of said blocking disc and said rotatable means, and
    an electromagnet with a coil arranged in minimum space to said ball in said saucer, said coil being operable when energized to exert an attractive force directly upon said ball to cause the latter to move upwardly in said saucer to positively move said pawl means upwardly into engagement with said ratchet gear means, thereby causing blockage of said rotatable means, the axis of the coil of said electromagnet being spaced upwardly from the axis of said ball which passes through the center of gravity of said ball and parallel to said axis of the coil so that electromagnet forces are effective in a direction corresponding to ball movement in said saucer substantially parallel to said coil axis by a distance necessary to cause said ball to move said pawl means into its effective position.

* * * * *